United States Patent
Ferm et al.

(10) Patent No.: US 7,489,264 B2
(45) Date of Patent: Feb. 10, 2009

(54) COORDINATION OF ELECTRONIC COUNTER MEASURES

(75) Inventors: Niklas Ferm, Linköping (SE); Thomas Lindvall, Linköping (SE)

(73) Assignee: SAAB AB, Linköping (SE)

( * ) Notice: Subject to any disclaimer, the term of this patent is extended or adjusted under 35 U.S.C. 154(b) by 388 days.

(21) Appl. No.: 11/306,925

(22) Filed: Jan. 17, 2006

(65) Prior Publication Data

US 2008/0136701 A1    Jun. 12, 2008

(30) Foreign Application Priority Data

Jan. 20, 2005    (EP)    ............................ 05001071

(51) Int. Cl.
 *G01S 7/38*    (2006.01)
(52) U.S. Cl. ...................................... 342/14; 342/58
(58) Field of Classification Search ................. 342/15, 342/14

See application file for complete search history.

(56) References Cited

U.S. PATENT DOCUMENTS

| | | | | |
|---|---|---|---|---|
| 4,307,400 A * | 12/1981 | Miley | .......................... | 342/14 |
| 4,823,139 A | 4/1989 | Eisner et al. | | |
| 5,287,110 A | 2/1994 | Tran et al. | | |
| 6,697,008 B1 * | 2/2004 | Sternowski | ................... | 342/14 |
| 2002/0145554 A1 * | 10/2002 | Lloyd et al. | .................... | 342/13 |
| 2003/0068981 A1 | 4/2003 | Duthie | | |
| 2004/0061595 A1 * | 4/2004 | Yannone et al. | .......... | 340/425.5 |

FOREIGN PATENT DOCUMENTS

BE    1 011 770 A4    2/2000

* cited by examiner

*Primary Examiner*—Thomas H Tarcza
*Assistant Examiner*—Matthew M Barker
(74) *Attorney, Agent, or Firm*—Venable LLP; Eric J. Franklin

(57) ABSTRACT

An electronic counter measures solution. Jamming signals are emitted towards a threat to improve chances of survival for at least two vehicles, which are physically separated from one another, however associated with one another in a group. Each of the at least two vehicles receives a wireless time reference signal from an external resource. The vehicles exchange messages over a wireless data link. The messages pertain to usage of at least one electronic warfare resource in each vehicle. Based on the messages and the time reference signal the usage of at least one first electronic warfare resource in a first vehicle is coordinated with the usage of at least one second electronic warfare resource in a second vehicle, such that a particular type of jamming signal is emitted alternately either from the at least one first resource or from the at least one second resource, essentially without any overlaps or gaps in time. Thereby, a false target is created between the vehicles with respect to a weapon which operates in a so-called Home-on-Jam mode.

10 Claims, 3 Drawing Sheets

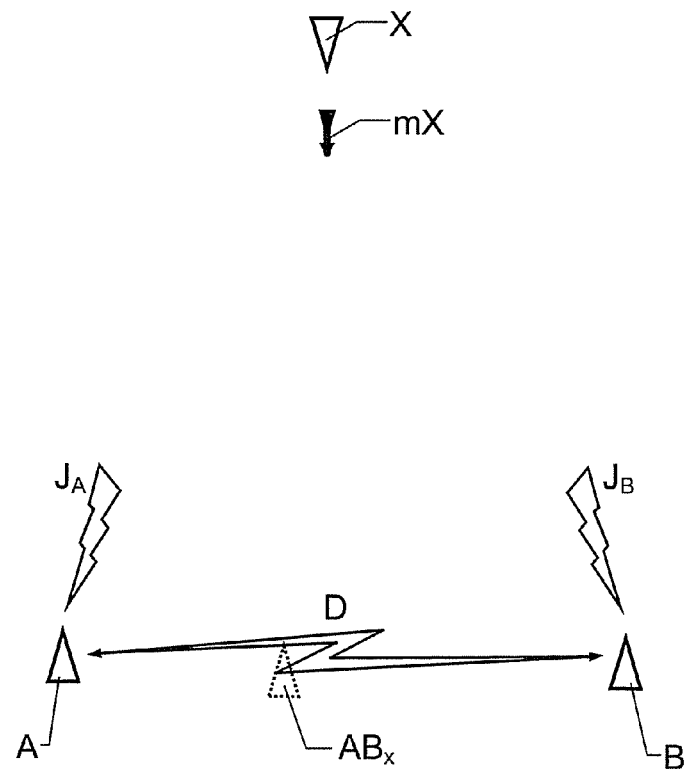
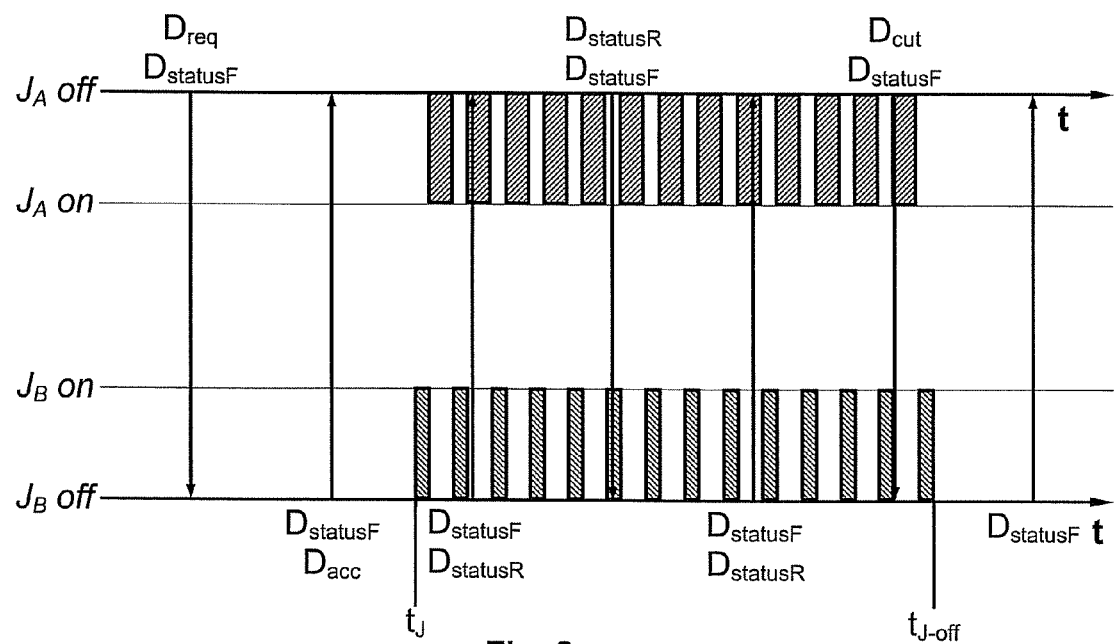

COORDINATION OF ELECTRONIC COUNTER MEASURES

DESCRIPTION

1. Field of the Invention

The present invention relates generally to electronic warfare and electronic counter measures. More particularly the invention relates to a method of producing jamming signals and electronic counter measures stations.

2. Background of the Invention

Electronic warfare systems play an increasingly important role in modern battle scenarios. Tactical electronic warfare assets are therefore included in almost every new military land, sea or air vehicle. These assets may primarily be used for the purposes of self-protection (i.e. jamming an enemy weapon and/or vehicle to decrease the quality of any measurements performed by this weapon and/or vehicle, and thereby improve the chances of own survival), or for the purposes of generating a background noise intended to improve the protection of the vehicle itself, or other vehicles included in a fleet or group of vehicles. The input data for controlling the vehicle mounted electronic warfare resources is here either derived from an interception receiver on each vehicle, preplanned actions or manually initiated operations performed by an operator/driver. Any coordinated radiation of jamming signals from different vehicles is primarily accomplished via verbal communication between the operators/drivers of the vehicles and manual actions executed by these persons.

However, the document U.S. Pat. No. 6,697,008 describes a distributed electronic warfare system wherein a central control site automatically coordinates jamming signals radiated from a plurality of electronic warfare pods attached to a variety of aircrafts, such that an improved jamming effect is attained against a particular target. Moreover, by means of GPS-based time synchronization and a central processing of signals received from a particular target in a plurality of pods, geolocation of the particular target is enabled.

The document BE, 1 011 770 A4 discloses a method for angular radio-electric scrambling of a radar tracking device. Two aircrafts here cooperate, so that a radar signal from a hostile vehicle received by a first aircraft (located in the range of the main lobe of the vehicle's aerial transmitter) is transmitted to a second aircraft (located outside the range of the main lobe). In addition to a signal reflection from the first aircraft, the second aircraft radiates a similar signal towards the hostile vehicle, which is based on the signal transmitted from the first aircraft. Thereby, the enemy vehicle registers an angular error in respect of the radar echo from the first aircraft, such that the first aircraft's risk of being struck by the hostile vehicle's weapons is reduced. Nevertheless, neither the first nor the second aircraft emits any jamming signals.

Hence, it is known to coordinate the transmission of jamming signals from a plurality of cooperating vehicles. The prior art also includes a solution as how to accomplish radar echoes with angular errors. However, there is yet no technical solution for automatically producing misleading jamming signals in order to avoid hostile missiles or other weapons, which may operate in a so-called Home-on-Jam (HOJ) mode.

SUMMARY OF THE INVENTION

It is therefore an object of the present invention to alleviate the above problem and thus provide an efficient and reliable solution for improving a vehicle's chances of evading any HOJ-based weapon systems.

According to one aspect of the invention this object is achieved by the method of producing jamming signals as described initially, wherein the messages exchanged over the wireless data link include data pertaining to a usage of at least one first electronic warfare resource in a first station in the group and at least one second electronic warfare resource in at least one second station in the group. The method also involves coordinating the usage of the at least one first and second resources based on the messages and the time reference signal, such that a particular type of jamming signal is emitted alternately either from the at least one first resource or from the at least one second resource. This altering of the origin of the jamming signal is performed essentially without any overlaps or gaps in time between the signals emitted from the different resources.

An important advantage attained by this strategy is that a point of balance for the jamming signals is placed outside each of the vehicles involved. Consequently, the jamming signals produce a false target, and any HOJ-based weapon fired towards the vehicles will most probably lock onto this false target, and therefore fail.

According to a preferred embodiment of this aspect of the invention, the method involves specifying signal parameter information pertaining to a number of known threats; specifying a counter measure library containing a complete set of electronic warfare resources comprising any resources, which are included in at least one station of the group; and identifying, for each of said threats, at least one of the resources in the complete set of electronic warfare resources, which is estimated to constitute an appropriate counter measure to combat the threat. This procedure (which preferably performed before instigating a mission) is advantageous because thereby the chances of applying efficient counter measures in each given situation are highly improved.

According to another preferred embodiment of this aspect of the invention, the method involves specifying a time synchronizing pattern describing a timing profile for a jamming signal to be emitted from each resource in the complete set of electronic warfare resources in respect of each threat. This is desirable, since thereby further guidance is provided as how to best combat a threat by means of coordinated emissions of jamming signals.

According to yet another preferred embodiment of this aspect of the invention, the method involves specifying, in each station, for each electronic warfare resource included in this station whether the resource is currently available or not for emitting jamming signals; and repeatedly exchanging status messages with the other stations in the group. Each message here reflects a current availability of the electronic warfare resource included in the station from which the message is transmitted. The method also involves recording, based on any received status messages from the other stations in the group, a resource activation status for each resource of the electronic warfare resource included in the other stations in the group. Hence, all stations in the group remain updated with information regarding the usage of the electronic warfare resources in all the stations without a central control mechanism being required. Naturally, this vouches for flexible and reliable coordinated employment of the electronic warfare resources.

According to still another preferred embodiment of this aspect of the invention, each station in the group is associated with at least one threat warning system. The method involves determining in a first station in the group, based on an output from the at least one threat warning system and the resources activation statuses, whether at least one particular threat is appropriate to combat by means of a first electronic warfare resource in this station in coordination with at least one second electronic warfare resource in at least one second station in the group. If it is found that such a coordination is appropriate, a request message is transmitted from the first station to the at least one second station. Then, the first station waits for at least one reply message to be returned from the at least one second station in response to the request message. If at least one of any received reply messages indicates a service accept, a jamming signal is emitted from the first electronic warfare resource in coordination with a jamming signal emitted from each of the at least one second electronic warfare resource in the at least one second station, which has replied with a message that indicates a service accept. Thereby, coordinated signal emission from multiple stations may be accomplished entirely without the involvement of a central control mechanism. This, in turn, provides a very robust system.

According to another preferred embodiment of this aspect of the invention, the emission of the jamming signals is maintained until the at least one threat warning system indicates that all threats being combated by the jamming signals have ceased to constitute threats, or a stop message is received from the at least one second station in respect of the jamming signals. Thus, jamming signals will be emitted only as long as required by the situation.

According to yet another preferred embodiment of this aspect of the invention, the coordination of the usage of the at least one first and second resources involves determining an absolute point in time when the emission of the particular type of jamming signal shall begin. This coordination also involves determining a time synchronizing pattern for the emission of the particular type of jamming signal from the first electronic warfare resource and the at least one second electronic warfare resource. Hence, the desired illusion of a seemingly continuous signal transmission from a false signal source can be created. Moreover, by varying the time synchronizing pattern, so that a duty cycle of each electronic warfare resource is modified over time, the false signal source's position relative to the first and at least one second station may be altered.

According to another aspect of the invention this object is achieved by a computer program directly loadable into the internal memory of a digital computer, comprising software for controlling the method described above when said program is run on a computer.

According to yet another aspect of the invention this object is achieved by a computer readable medium, having a program recorded thereon, where the program is to make a computer perform the method described above.

According to another aspect of the invention this object is achieved by an electronic counter measures station for radiating jamming signals as described initially, wherein the communication unit is adapted to exchange the messages with at least one other electronic counter measures station, which is physically separated from the station and is associated with the station to form a group of stations. The messages include data pertaining to a usage of the at least one first electronic warfare resource and at least one corresponding second electronic warfare resource in at least one other electronic counter measures station in the group. The station also includes a resource handling unit adapted to, based on the messages and the time reference signal, coordinate the usage of the at least one first and second resources such that a particular type of jamming signal is emitted alternately either from the at least one first resource, or from the at least one second resource. The station is adapted to carry out this altering of the origin of the jamming signal essentially without any overlaps or gaps in time between the signals emitted from the different resources.

The advantages of this station, as well as the preferred embodiments thereof, are apparent from the discussion hereinabove with reference to the proposed method.

Further advantages, advantageous features and applications of the present invention will be apparent from the following description and the dependent claims.

BRIEF DESCRIPTION OF THE DRAWINGS

The present invention is now to be explained more closely by means of preferred embodiments, which are disclosed as examples, and with reference to the attached drawings.

FIG. 1 illustrates an electronic warfare situation, in which the invention may be employed to evade a hostile weapon, FIG. 2 shows time lines, which illustrate how a coordination procedure according to the invention may be implemented.

DETAILED DESCRIPTION OF THE INVENTION

Figure 3:
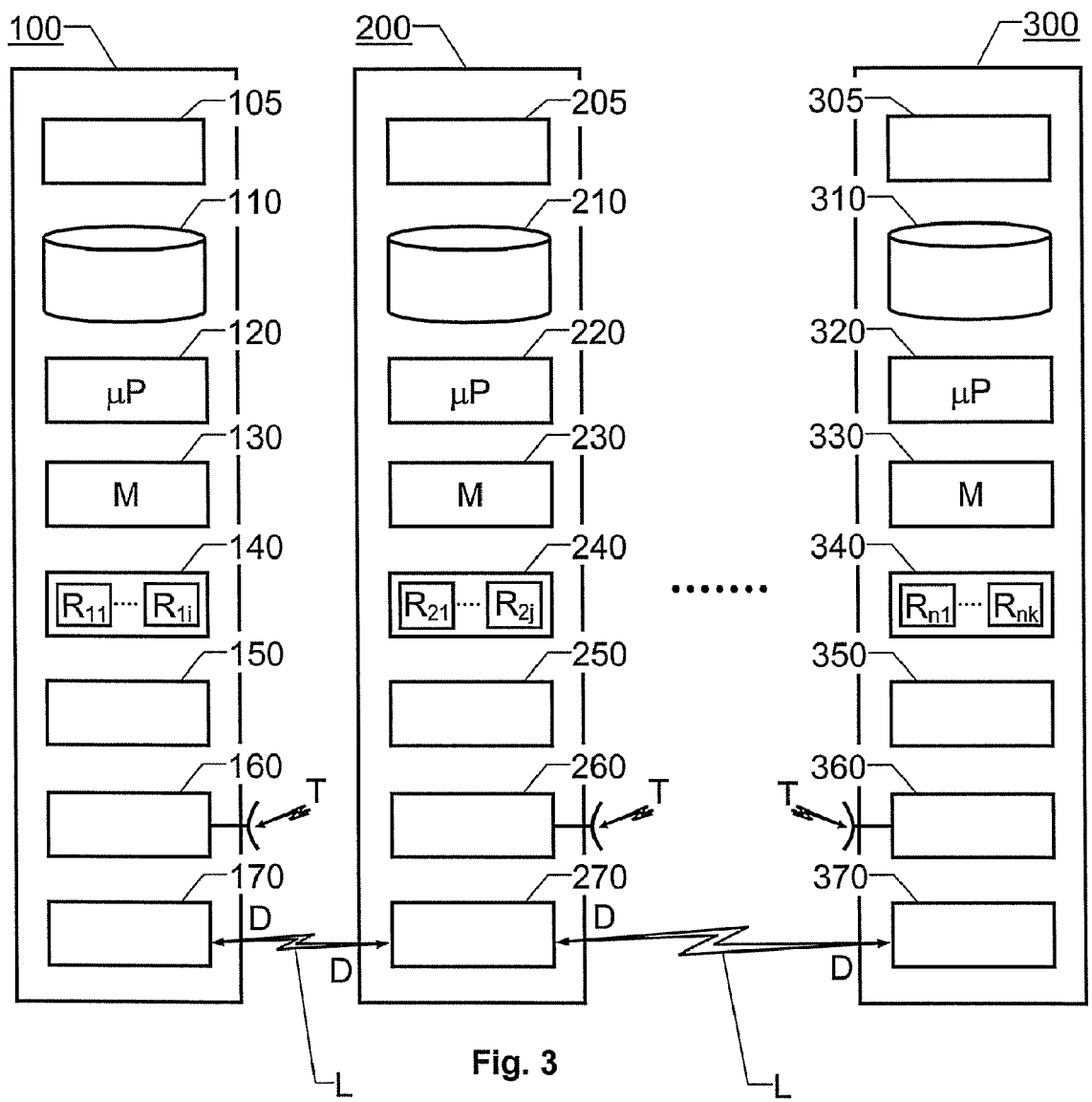
FIG. 3 shows block diagrams over the stations in a group which cooperate according to one embodiment of the invention.

FIG. 1 shows two air vehicles A and B respectively, which each includes a proposed electronic counter measures station. It is presumed that a threat warning system of at least one of the vehicles A or B, say A, has registered a hostile air vehicle X, and/or a missile mX fired from this vehicle X. We further presume that each of the vehicles A and B is equipped with at least one electronic warfare resource, and that the vehicles A and B repeatedly exchange messages D indicating a current activation status of these resources.

Moreover, each vehicle A and B is equipped with a database including a threat library, which specifies signal parameter information pertaining to a number of known threats. The database also includes a counter measure library, which specifies a complete set of electronic warfare resources that are carried either by the vehicle A, the vehicle B, or both vehicles. A table in the database, for each threat in the threat library, identifies at least one of the resources in the complete set of electronic warfare resources which is estimated to constitute an appropriate counter measure to combat the threat.

Thus, based on an output from the threat warning system and the table in the onboard database, the vehicle A can determine an appropriate counter measure to combat the threat represented by the missile mX and/or the vehicle X. In addition, the vehicle A can determine whether suitable aiding counter measures are available in the vehicle B on the basis of the messages D received from this vehicle B.

For illustrating purposes we presuppose that appropriate counter measures are available in both the vehicles A and B, and that therefore electronic warfare resources in the vehicle A can be coordinated with electronic warfare resources in the vehicle B to combat the threat, which the missile mX and/or the vehicle X constitutes. According to the invention, this means that a particular type of jamming signals $J_A$ and $J_B$ respectively are emitted alternately from either a resource in the vehicle A or from a resource in the vehicle B essentially without any overlaps or gaps in time. Provided that the signal sources are altered with sufficient speed and accuracy, the missile mX and/or the vehicle X will, as a result of this altering, conclude that the jamming signals $J_A$ and $J_B$ originate from a single electronic warfare resource which is located at a point of balance somewhere between the vehicles A and B. Hence, provided that the threat mX and/or X is guided by the jamming signals $J_A$ and $J_B$ (i.e. is HOJ-operated), a false target $AB_X$ has been created with respect to this threat that lies physically outside both the vehicles A and B.

If both signal sources are located at equal distances from the threat and transmit an equal amount of energy, e.g. by emitting an equal signal power during equally long durations per period, the false target $AB_X$ will appear to be located halfway between the vehicles A and B. However, by varying the signals' time synchronizing pattern, so that a duty cycle of each electronic warfare resource is modified over time, the false target's $AB_X$ position relative to the vehicles A and B can be altered, for instance as shown in FIG. 1 where the false target $AB_X$ is located closer to the vehicle A. This, of course, is an effect of the signal energy emitted from the electronic warfare resource in this vehicle A exceeding the signal energy emitted from the electronic warfare resource in the vehicle B. In analogy, if a first vehicle is estimated to be more proximate to a particular threat than a second vehicle, the false target may appear to be located halfway between these vehicles if larger jamming signal energy is emitted from the second vehicle, i.e. the more distant vehicle.

A prerequisite for accomplishing a sufficient time accuracy (with errors less than milliseconds) in the altering of the signal emission from the electronic warfare resources of the vehicles A and B respectively, the vehicles need to receive a common and very precise time reference signal. According to a preferred embodiment of the invention, this signal is delivered by an external signal source included in a global navigation satellite systems (GNSS), such as the Global Positioning System (GPS; provided by the U.S. Government), the Galileo system (provided by the European programme for global navigation services) or the Global Orbiting Navigation Satellite System (GLONASS; provided by the Russian Federation Ministry of Defense).

Referring now to FIG. 2, the proposed coordinated use of electronic warfare resources in different stations will be discussed in further detail. The FIG. 2 shows a first time line representing an electronic warfare resource of a first electronic counter measures station, e.g. included in the vehicle A of FIG. 1, and a second time line representing an electronic warfare resource of a second electronic counter measures station, e.g. included in the vehicle B of FIG. 1. Each time line illustrates an on-state $J_A$ on and $J_B$ on respectively in which a jamming signal is emitted from the resource in question, and an off-state $J_A$ off and $J_B$ off respectively in which no jamming signal is emitted.

Preferably, the vehicles A and B repeatedly (e.g. at regular intervals) exchange messages during an entire mission, whereby the messages reflect a current status and availability of the electronic warfare resources included in the respective vehicle. As long as no threat has been registered the electronic warfare resources are typically inactivated, and thus the corresponding messages $D_{statusF}$ indicate that these resources are available. However, at a particular point in time, the first electronic counter measures station deduces that a particular type of jamming signals should be emitted to combat at certain threat, and that the effect of such signals would be improved if they were emitted in coordination with an available electronic warfare resource in the second station. Therefore, the first station includes a request message $D_{req}$ in a message sent to the second station. Preferably, the request message $D_{req}$ specifies an absolute point in time $t_J$, which determines when the transmission of the jamming signals shall begin. The request message $D_{req}$ may also determine a time synchronizing pattern for the emission of the jamming signals, so that each station knows how often, how long, at which power, and possibly in which direction the signal is to be transmitted. Alternatively, the time synchronizing pattern is derived from an onboard database included in each station. Such a database contains predefined time synchronizing patterns for each combination of threat and counter measure. If the second station itself is able to register and measure relevant parameters of the threat, the direction in which to transmit the jamming signal is preferably determined locally in the second station. Otherwise this direction may be given in the request message $D_{req}$. In addition to addressee data (i.e. an identification of the second station), the request message $D_{req}$ preferably contains a reference number (to facilitate future reference to the efforts of combating the threat in question), a threat identifier (which uniquely describes the threat) and a designation of which type of counter resource that is to be employed.

The message to the second station also specifies a current status and availability $D_{statusF}$ of the electronic warfare resources included in the vehicle A.

In response to the request message $D_{req}$, the second station returns a service accept message $D_{acc}$, which confirms that the particular resource will be engaged under the conditions specified in the request message $D_{req}$. Then, at $t_J$, the second station starts to emit the jamming signal according to the determined time synchronizing pattern. According to an alternative embodiment of the invention, the starting point $t_J$ for the transmission is specified in the service accept message $D_{acc}$, instead of the request message $D_{req}$. Namely, thereby $t_J$ may be selected sufficiently far ahead to guarantee that the accepting station is prepared to start the transmission at this point in time. As can be seen in the FIG. 2, in this case, the duty cycle is not entirely balanced between the stations. Instead, the first station emits somewhat more signal energy than the second station. As a result, the false target perceived by a HOJ-operated threat/enemy weapon will appear to be located closer to the first station than to the second station (compare with the FIG. 1).

During the period when jamming signals are emitted, the stations continue to exchange message which indicate the status and availability of their electronic warfare resources, i.e. which resources that are presently used (or are unavailable for other reasons) $D_{statusR}$ and available $D_{statusF}$ respectively.

As soon as one of the stations, say the first station in the vehicle A, has registered that the threat combated by the jamming signals no longer exists (or at least does not constitute a threat), this station includes a deactivation order $D_{cut}$ in the message sent to the other station(s), i.e. in this case the second station in the vehicle B. The deactivation order $D_{cut}$ specifies an absolute point in time $t_{J\text{-}off}$ when the transmission of jamming signals should end. Thus, after this point in time $t_{J\text{-}off}$, none of the first or second stations emits any jamming signals (at least not in respect of the threat in question). However, the stations continue to exchange messages $D_{statusF}$ that reflect the status and availability of their respective electronic warfare resources.

Alternatively, a deactivation order $D_{cut}$ may be generated by a station in respect of a first threat if this station registers one or more higher prioritized threats, and there fore cannot continue to combat the first threat. Nevertheless, the first threat may still constitute a threat to the station itself as well as other to other stations in the group.

Even though the FIGS. 1 and 2 only show two cooperating stations, it is readily understood by the skilled person that the proposed shifting of the jamming signal source between different stations can be extended to three or more stations, so that in the case of n stations the transmission cycle is divided into n segments, each in which exclusively one station transmits a jamming signal. Thus, in respect of a HOJ-operated weapon, a false target is created which appear to be located physically separated from each of the n stations.

FIG. 3 shows block diagrams over electronic counter measures stations 100, 200 and 300 in a group of stations which are adapted to cooperate according to one embodiment of the invention. Specifically, the stations 100, 200 and 300 are adapted to radiate jamming signals in coordination with one another, such that a particular type of jamming signal is emitted alternately either from at least one first resource, say $R_{11}$, in one station (e.g. 100); or from at least one second resource, say $R_{21}$, in another station, (e.g. 200) essentially without any overlaps or gaps in time.

All the stations 100, 200 and 300 include essentially the same devices and units. However, the number and types of resources $R_{11}, \ldots, R_{1i}, R_{21}, \ldots, R_{2j}; R_{n1}, \ldots, R_{nk}$ included in an electronic warfare system 140, 240 and 340 respectively of each station may vary.

Nevertheless, a first station 100 preferably includes (or is associated with) at least one threat warning system 105. The first station 100 also includes a database 110, an electronic warfare system 140, a resource-handling unit 150, a receiver unit 160 and a communication unit 170. The threat warning system 105 typically includes an interception receiver, which is adapted to detect signals emitted by potential enemy vehicles and/or missiles. The electronic warfare system 140 includes at least one electronic warfare resource $R_{11}, \ldots, R_{1i}$, which is adapted to generate and emit at least one type of jamming signal. The resource-handling unit 150 is adapted to repeatedly control the communication unit 170 to exchange status messages D with the other stations 200, 300 over a wireless data link L. As mentioned above, the messages D comprise data pertaining to a usage of the station's 100, 200, 300 electronic warfare resources. Specifically, a message D transmitted from the first station 100 contains data pertaining to a status and availability of the resources $R_{11}, \ldots, R_{1n}$ in the electronic warfare system 140. Correspondingly, a message D transmitted from a second station 200 contains data pertaining to a status and availability of the resources $R_{21}, \ldots, R_{2j}$ in an electronic warfare system 240 of this station, and so on. Typically, the frequency at which messages D are exchanged over the link L depends on the number of stations that are associated with one another to form a group, such that in a relatively large group the update frequency is comparatively low, and vice versa. However, the update rate normally lies in the interval 1 to 2 seconds.

The receiver unit 160 is adapted to receive a wireless time reference signal T from an external resource, such as a satellite of a GNSS. The resource handling unit 150 is adapted to, based on the messages D and the time reference signal T, coordinate the usage of at least one first resource in the station 100 itself (i.e. one of $R_{11}, \ldots, R_{1i}$) and at least one of the corresponding resources $R_{21}, \ldots, R_{2j}$ and $R_{n1}, \ldots, R_{nk}$ of at least one of the other stations 200 and 300, such that a particular type of jamming signal is emitted alternately either from the first resource or from the at least one second resource, essentially without any overlaps or gaps in time.

Figure 4:
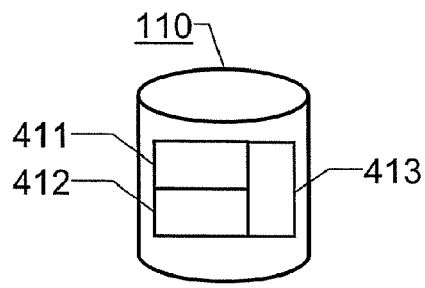
FIG. 4 illustrates a proposed database to be included in each station according to one embodiment of the invention.

According to a preferred embodiment of the invention, the station 100 contains a database 110, which in turn, includes a threat library 411, a counter measure library 412 and a table 413. The details of this database 110 will be elucidated below with reference to FIG. 4.

The threat library 411 specifies signal parameter information pertaining to a number of known threats. The counter measure library 412 specifies a complete set of electronic warfare resources, containing any resources which are included in at least one of the stations 100, 200 or 300 in the group, i.e. $R_{11}, \ldots, R_{1i}; R_{21}, \ldots, R_{2j}; R_{n1}, \ldots, R_{nk}$. Preferably, for each resource in the complete set of electronic warfare resources $R_{11}, \ldots, R_{1i}; R_{21}, \ldots, R_{2j}; R_{n1}, \ldots, R_{nk}$, the counter measure library 412 also specifies a time synchronizing pattern describing a timing profile for a jamming signal to be emitted by the resource. The table 413 in the database 110 identifies, for each threat in the library 412, at least one of the resources in the complete set of electronic warfare resources $R_{11}, \ldots, R_{1i}; R_{21}, \ldots, R_{2j}; R_{n1}, \ldots, R_{nk}$ that is estimated to constitute an appropriate counter measure to combat the threat. Thus, when the station 100 registers a threat, e.g. by means of the warning system 105, the database may provide information as how to best combat this threat, i.e. which electronic warfare resources to use as well as the parameters for the jamming signal(s) to emit.

Preferably, the database 110 is prepared before instigating a certain mission, such that it stores as relevant and updated information as possible. It is also highly preferable if corresponding databases 210 and 310 in the other stations 200 and 300 respectively contain information which is identical to the information in the database 110.

Figure 5:
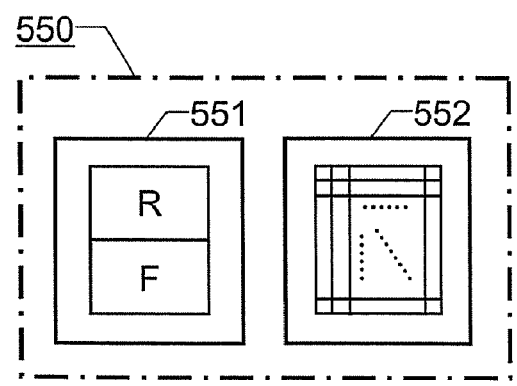
FIG. 5 shows a block diagram over a counter measures resources record according to one embodiment of the invention.

FIG. 5 shows a block diagram over a counter measures resources record 550 to be stored in (or be associated with) the resource-handling unit 150 according to one embodiment of the invention. The record 550 contains a local resource listing 551 and a group resource listing 552.

The local resource listing 551 specifies, for each electronic warfare resource $R_{11}, \ldots, R_{1i}$ included in the station 100, whether the resource is currently available or not (i.e. if the resource is operable and free, or if the resource is occupied or unusable due to technical problems). The group resource listing 552 specifies an activation status for each electronic warfare resource $R_{21}, \ldots, R_{2j}$ and $R_{n1}, \ldots, R_{nk}$ included in the other stations 200 and 300 of the group.

The resource-handling unit 150 repeatedly (preferably at regular intervals) checks the status of the electronic warfare resource $R_{11}, \ldots, R_{2i}$ of the electronic warfare system 140, and updates the group resource listing 552 accordingly with a current resource activation status for each resource. This data is also included in the messages $D_{statusR}$ and $D_{statusF}$, which are sent to the other stations 200 and 300 over the wireless data link L. Moreover, based on corresponding messages received from the other stations 200 and 300 in the group, the resource handling unit 150 repeatedly (preferably at regular intervals) updates the group resource listing 552 with a current resource activation status for each resource of the electronic warfare resource $R_{21}, \ldots, R_{2j}$ and $R_{n1}, \ldots, R_{nk}$ included in these stations 200 and 300.

Hence, whenever the resource-handling unit 150 in the station 100 determines that a threat exists, based on an output from the least one threat warning system 105, the unit 150 may consult the counter measures resources record 550 to find suitable resources to combat this threat. If, on the further basis of the database 110, the resource handling unit 150 finds that it is appropriate to use one or more counter measures resources of the other stations 200 and 300 to combat this threat, relevant requests are sent out over the wireless data link L to these stations via the communication unit 170 according to what has been described above with reference to the FIGS. 1 and 2.

Returning again to the FIG. 3, each of the second 200, third, etc. station up to an n:th station 300 associated with one another in a group includes devices and units 205; 305, 210; 310, 220; 320, 230; 330, 240; 340, 250; 350, 260; 360 and 270; 370 equivalent to the devices and units 105, 110, 120, 130, 140, 150, 160 and 170 respectively described above with reference to the first station 100.

Figure 6:
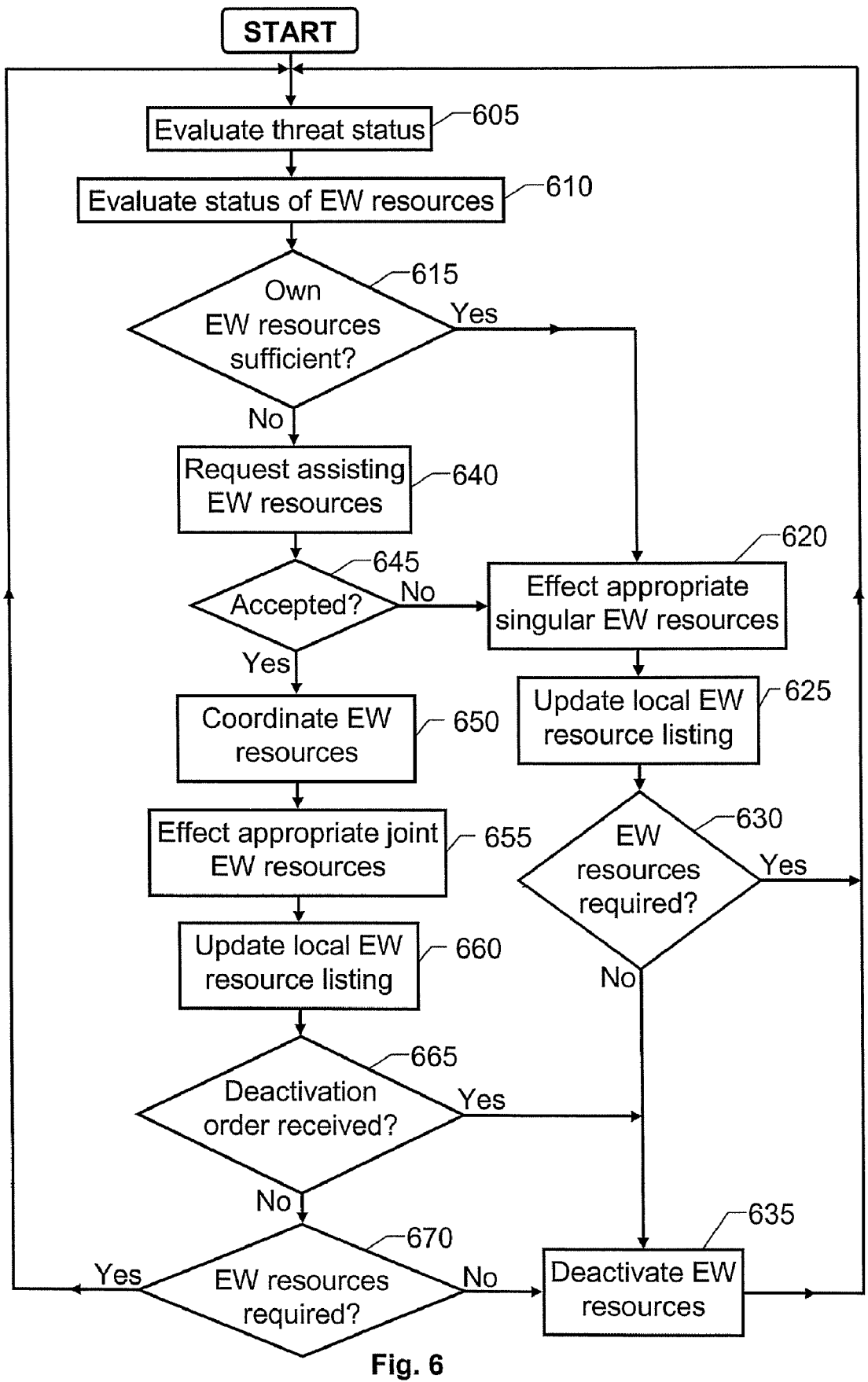
FIG. 6 shows a flow diagram over the general method according to the invention.

In order to sum up, the general method for coordinating electronic counter measures according to the invention will now be described with reference to FIG. 6. It is worth noting that the method illustrated in the FIG. 6 neither describes the steady-state status messages exchanged between the stations nor the specific messages exchanged in connection with initiating and ending of the coordinated signal emission. Instead, the flow diagram discloses a higher-level procedure, which is performed by a particular station when detecting and combating a threat by means of electronic counter measures being coordinated with at least one other station.

A first step 605, evaluates a current threat status, for instance via a threat warning system. Then, a step 610 evaluates a current status of the electronic warfare resources, i.e. those resources that are included in the station itself and those resources that are included in any other stations belonging to the same group as the station. This evaluation is preferably performed by means of the above-described resource-handling unit. Subsequently, a step 615 checks, e.g. based on the above-described onboard database and the local resource listing, whether the vehicle's own available electronic warfare resources are deemed to be sufficient to combat the threat, and if so a step 620 follows. Otherwise, the procedure continues to a step 640.

The step 620 effects the appropriate electronic warfare resources on a singular basis, i.e. without coordination with other stations. After that, a step 625 updates the local resource listing, so that the fact that certain resources now are employed can be reflected in status messages sent to the other stations. A following step 630, checks whether it is still required to employ the electronic warfare resources, and if so the procedure returns to the step 605 while the jamming signal continues to be emitted. Otherwise, a step 635 follows, which deactivates the electronic warfare resources. Then, the procedure returns to the step 605.

The step 640 sends out a request for assisting electronic warfare resources, i.e. resources included in at least one other station. Such a request is primarily sent to one or more of those stations, which based on the above-described group resource listing, have available resources that are deemed appropriate to combat the detected threat (based on the above-described database). Then, a step 645 checks whether the request is accepted, i.e. if at least one service accept message is returned, and if so a step 650 follows. Otherwise, the procedure continues to the step 620.

The step 650 coordinates the use of the electronic warfare resources with the at least one other station that has returned a service accept message according to what has been described above. Subsequently, a step 655 effects the appropriate resources in alternating coordination with the at least one other station, and a step 660 updates the local resource listing accordingly, so that the fact that certain resources now are employed can be reflected in status messages sent to the other stations.

A following step 665, checks whether a deactivation order has been received in respect of the jamming signals emitted by the resources employed in alternating coordination with the at least one other station, and if so the procedure continues to the step 635. Otherwise, a step 670 follows, which checks whether, based on the onboard threat warning system, employment of the electronic warfare resources still is required. If this is found not to be the case, the step 635 follows. Otherwise, the procedure returns to the step 605 while the jamming signal continues to be emitted.

All of the process steps, as well as any sub-sequence of steps, described with reference to the FIG. 6 above may be controlled by means of a programmed computer apparatus. Moreover, although the embodiments of the invention described above with reference to the drawings comprise computer apparatus and processes performed in computer apparatus, the invention thus also extends to computer programs, particularly computer programs on or in a carrier, adapted for putting the invention into practice. The program may be in the form of source code; object code, a code intermediate source and object code such as in partially compiled form, or in any other form suitable for use in the implementation of the process according to the invention. The carrier may be any entity or device capable of carrying the program. For example, the carrier may comprise a storage medium, such as a Flash memory, a ROM (Read Only Memory), for example a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

The term "comprises/comprising" when used in this specification is taken to specify the presence of stated features, integers, steps or components. However, the term does not preclude the presence or addition of one or more additional features, integers, steps or components or groups thereof.

The invention is not restricted to the described embodiments in the figures, but may be varied freely within the scope of the claims.

What is claimed is:

1. A method of producing jamming signals comprising:
    receiving a wireless time reference signal from an external resource,
    exchanging messages over a wireless data link, and
    generating at least one type of jamming signal based on the time reference signal and the messages, the at least one type of jamming signal being emitted from two or more stations physically separated from one another and associated with one another in a group of stations, wherein each station in the group is associated with at least one threat warning system, wherein the messages comprise data pertaining to a usage of at least one first electronic warfare resource in a first station in the group and at least one second electronic warfare resource in at least one second station in the group,
    coordinating the usage of the at least one first and second resources based on the messages and the time reference signal, such that a particular type of jamming signal is emitted alternately either from the at least one first resource or from the at least one second resource essentially without any overlaps or gaps in time specifying, in each station, for each electronic warfare resource included in this station whether the resource is currently available or not for emitting jamming signals;

exchanging, repeatedly, status messages with the other stations in the group, each message reflecting a current availability of the electronic warfare resource included in the station from which the message is transmitted;

recording, based on any received status messages from the other stations in the group, a resource activation status for each resource of the electronic warfare resource included in the other stations in the group;

determining, based on an output from the at least one threat warning system and the resources activation statuses, in a first station in the group whether at least one particular threat is appropriate to combat by means of a first electronic warfare resource in this station in coordination with at least one second electronic warfare resource in at least one second station in the group; and if such a coordination is found to be appropriate transmitting a request message from the first station to the at least one second station; and waiting for at least one reply message to be returned from the at least one second station in response to the request message; and if at least one of any received reply messages indicates a service accept emitting a jamming signal from the first electronic warfare resource in coordination with a jamming signal emitted from each of the at least one second electronic warfare resource in the at least one second station having replied with a message indicating a service accept.

2. The method according to claim 1, further comprising:

specifying signal parameter information pertaining to a number of known threats;

specifying a counter measure library containing a complete set of electronic warfare resources comprising any resources which are included in at least one station of the group; and identifying, for each of said threats, at least one of the resources in the complete set of electronic warfare resources which is estimated to constitute an appropriate counter measure to combat the threat.

3. The method according to claim 2, further comprising:

specifying a time synchronizing pattern describing a timing profile for a jamming signal to be emitted from each resource in the complete set of electronic warfare resources in respect of each of said known threats.

4. The method according to claim 1, further comprising:

maintaining the emission of the jamming signals until the at least one threat warning system indicates that all threats being combated by the jamming signals have ceased to constitute threats, or a deactivation order is received from the at least one second station in respect of the jamming signals.

5. The method according to claim 1, wherein the coordination of the usage of the at least one first and second resources comprises:

determining an absolute point in time when the emission of the particular type of jamming signal shall begin; and determining a time synchronizing pattern for the emission the particular type of jamming signal from the first electronic warfare resource and the at least one second electronic warfare resource.

6. A computer program product, comprising:

a computer readable medium; and computer program instructions recorded on the computer readable medium and executable by a processor for producing jamming signals, wherein the computer program instructions for carrying out a method comprising:

receiving a wireless time reference signal from an external resource, exchanging messages over a wireless data link, and generating at least one type of jamming signal based on the time reference signal and the messages, the at least one type of jamming signal being emitted from two or more stations physically separated from one another and associated with one another in a group of stations, wherein each station in the group is associated with at least one threat warning system, wherein the messages comprising data pertaining to a usage of at least one first electronic warfare resource in a first station in the group and at least one second electronic warfare resource in at least one second station in the group, coordinating the usage of the at least one first and second resources based on the messages and the time reference signal, such that a particular type of jamming signal is emitted alternately either from the at least one first resource or from the at least one second resource essentially without any overlaps or gaps in time coordinating the usage of the at least one first and second resources based on the messages and the time reference signal, such that a particular type of jamming signal is emitted alternately either from the at least one first resource or from the at least one second resource essentially without any overlaps or gaps in time, specifying, in each station, for each electronic warfare resource included in this station whether the resource is currently available or not for emitting jamming signals, exchanging, repeatedly, status messages with the other stations in the group, each message reflecting a current availability of the electronic warfare resource included in the station from which the message is transmitted, recording, based on any received status messages from the other stations in the group, a resource activation status for each resource of the electronic warfare resource included in the other stations in the group, determining, based on an output from the at least one threat warning system and the resources activation statuses, in a first station in the group whether at least one particular threat is appropriate to combat by means of a first electronic warfare resource in this station in coordination with at least one second electronic warfare resource in at least one second station in the group; and if such a coordination is found to be appropriate transmitting a request message from the first station to the at least one second station, and waiting for at least one reply message to be returned from the at least one second station in response to the request message; and if at least one of any received reply messages indicates a service accept emitting a jamming signal from the first electronic warfare resource in coordination with a jamming signal emitted from each of the at least one second electronic warfare resource in the at least one second station having replied with a message indicating a service accept.

7. An electronic counter measures station for radiating jamming signals, comprising:

a receiver unit adapted to receive a wireless time reference signal from an external resource;

a communication unit adapted to exchange messages over a wireless data link; and at least one electronic warfare resource adapted to generate and emit at least one type of jamming signal based on the time reference signal and the messages, wherein the communication unit is adapted to exchange the messages with at least one other electronic counter measures station which is physically separated from the station and is associated with the station to form a group of stations;

the messages comprise data pertaining to a usage of the at least one first electronic warfare resource and at least one corresponding second electronic warfare resource in at least one other electronic counter measures station in the group; and the station comprises a resource handling unit adapted to, based on the messages and the time reference signal, coordinate the usage of the at least one first and second resources, such that a particular type of jamming signal is emitted alternately either from the at least one first resource or from the at least one second resource essentially without any overlaps or gaps in time, wherein the station is associated with at least one threat warning system, wherein the resource handling unit is adapted to repeatedly control the communication unit to exchange status messages with the other stations in the group, each message reflecting a current availability of the electronic warfare resource included in the station from which the message is transmitted, wherein the resource handling unit comprises a local resource listing which for each electronic warfare resource included in the station specifies whether the resource is currently available or not for emitting jamming signals, wherein the resource handling unit further comprises a group resource listing which specifies an activation status for each electronic warfare resource included in the at least one other station of the group, wherein the resource handling unit is adapted to update the group resource listing with a current resource activation status for each resource of the electronic warfare resource included in the other stations in the group based on any received status messages from the other stations in the group, wherein the resource handling unit is adapted to determine, based on an output from the least one threat warning system and the resources activation statuses, whether at least one particular threat is appropriate to combat by means of a first electronic warfare resource in this station in coordination with at least one second electronic warfare resource in at least one second station in the group, and if such a coordination is found to be appropriate control the communication unit to transmit a request message from the first station to the at least one second station, wherein the resource handling unit is adapted to control the communication unit to wait for at least one reply message being returned from the at least one second station in response to the request message, and if the least one reply message indicates a service accept emitting a jamming signal from the first electronic warfare resource in coordination with a jamming signal emitted from each of the at least one second electronic warfare resource in the at least one second station having replied with a message indicating a service accept.

8. The station according to claim 7, further comprising:
a database including:
a threat library specifying signal parameter information pertaining to a number of known threats;
a counter measure library specifying a complete set of electronic warfare resources containing any resources which are included in at least one of the stations in the group; and
a table which for each of said threats identifies at least one of the resources in the complete set of electronic warfare resources that is estimated to constitute an appropriate counter measure to combat the threat.

9. The station according to claim 8, wherein the counter measure library for each resource in the complete set of electronic warfare resources specifies a time synchronizing pattern describing a timing profile for a jamming signal to be emitted by the resource in respect of each of said known threats.

10. The station according to claim 7, wherein the resource handling unit is adapted to maintain the emission of the jamming signals until
the at least one threat warning system indicates that all threats being combated by the, jamming signals have ceased to constitute threats, or
the communication unit receives a deactivation order from the at least one other station in respect of the jamming signals.

* * * * *